(12) United States Patent
Levi

(10) Patent No.: US 12,464,324 B1
(45) Date of Patent: Nov. 4, 2025

(54) DIGITAL MESSAGING SYSTEMS AND METHODS WITH PRE-SENDING MESSAGE MODERATION

(71) Applicant: Daniel Levi, Tel-Aviv (IL)

(72) Inventor: Daniel Levi, Tel-Aviv (IL)

( * ) Notice: Subject to any disclaimer, the term of this patent is extended or adjusted under 35 U.S.C. 154(b) by 0 days.

(21) Appl. No.: 19/273,004

(22) Filed: Jul. 17, 2025

(30) Foreign Application Priority Data

Jun. 10, 2025 (IT) .................. 102025000013534

(51) Int. Cl.
*H04W 4/10* (2009.01)
*G10L 15/18* (2013.01)
*G10L 25/51* (2013.01)

(52) U.S. Cl.
CPC ........... *H04W 4/10* (2013.01); *G10L 15/1815* (2013.01); *G10L 25/51* (2013.01)

(58) Field of Classification Search
CPC ......... H04W 4/10; H04W 4/80; H04W 88/06; H04W 8/183; H04W 84/12; H04W 52/0209; H04W 24/08; H04W 76/10; H04W 92/18; H04W 4/023; H04W 4/025; H04W 84/18; H04W 12/63; G10L 15/1815; G10L 25/51; G10L 25/30; G10L 19/20; G10L 15/04; G10L 15/02; G10L 19/26; G10L 25/03; G10L 19/008; G10L 15/063; G10L 21/0208; G10L 15/20; G10L 2021/02165; G10L 15/16; G10L 15/22; G10L 25/84; G10L 15/26; G10L 25/93; G10L 25/90; H04R 2430/03; H04R 5/04; H04R 2430/00; H04R 3/00; H04L 12/40006; H04L 41/0894; G06F 2201/805; G06N 20/00; G06N 3/08; G06N 3/02; H04M 1/6066

See application file for complete search history.

(56) References Cited

U.S. PATENT DOCUMENTS

| | | | |
|---|---|---|---|
| 11,706,580 B2* | 7/2023 | Stanek | H04W 4/10 |
| 12,288,563 B2* | 4/2025 | Kale | G10L 25/30 |
| 12,408,009 B2* | 9/2025 | Cordes | H04W 4/10 |
| 2016/0284346 A1* | 9/2016 | Visser | G10L 25/51 |
| 2020/0043509 A1* | 2/2020 | Chen | G06N 20/00 |
| 2021/0204359 A1* | 7/2021 | Pai | H04W 84/18 |

\* cited by examiner

*Primary Examiner* — Lana N Le
(74) *Attorney, Agent, or Firm* — The Roy Gross Law Firm, LLC; Roy D. Gross

(57) ABSTRACT

A voice communications system comprises a user interface with a push-to-talk (PTT) button, a communication module configured to transmit a signal from a first user to a second user upon activation of the PTT button without establishing a communication channel, and a receiver module that allows the second user to either accept the signal, thereby initiating a live audio stream, or ignore it. The system includes a voice streaming module for transmitting audio data while the PTT button is engaged and an artificial intelligence filtering module for real-time classification and moderation of the audio data, ensuring that the audio data is sent to the recipient only after approval by the filtering module. Additionally, the system can moderate pre-recorded digital messages prior to their transmission to a recipient.

11 Claims, 3 Drawing Sheets

DIGITAL MESSAGING SYSTEMS AND METHODS WITH PRE-SENDING MESSAGE MODERATION

CROSS REFERENCE TO RELATED APPLICATIONS

This application claims the benefit of priority of Italian Patent Application No. 102025000013534, filed Jun. 10, 2025, the contents of which are incorporated by reference in their entirety.

FIELD OF THE INVENTION

The present invention relates to communication systems in general, and in particular to push-to-talk interaction protocols enhanced by artificial intelligence (AI) for real-time voice communication.

BACKGROUND

In the field of mobile and web-based communication systems, traditional methods such as voice calls and recorded messages present several limitations. These conventional systems often lack user control, real-time moderation, and intelligent interaction capabilities. As a result, platforms that facilitate service delivery, online interactions, or customer support frequently encounter challenges related to harassment, inefficiency, and communication overload. The absence of a structured, consent-based push-to-talk voice interaction system that incorporates real-time AI moderation further exacerbates these issues.

Existing push-to-talk (PTT) solutions and voice communication tools, such as VoIP or phone calls, typically require persistent user control or account linkage, which are not suitable for ad hoc, one-time, anonymized coordination. These models are inadequate for scenarios where communication should be limited in time, linked to a specific task or transaction, and anonymous by design. Furthermore, they often lack automated activation and deactivation features, which are crucial for maintaining privacy and reducing unnecessary exposure.

The current state of communication technology does not adequately address the need for temporary, session-based voice communication that is both context-aware and privacy-preserving. Traditional systems often require manual intervention to initiate or terminate communication, leading to inefficiencies and potential privacy breaches. Additionally, these systems do not provide the flexibility needed for cross-platform support, which is essential for users who may not have prior app installations.

What is needed is a communication system that enables structured, consent-based push-to-talk voice interactions with real-time AI moderation. Such a system would allow users to initiate voice requests in a non-intrusive manner, with the recipient having the option to accept or ignore the interaction. The integration of AI modules for real-time sentiment analysis and behavioral moderation would enhance security and efficiency, while preserving user privacy by eliminating the need for phone number sharing. This approach would address the shortcomings of existing technologies by providing a flexible, context-aware solution that is applicable across various platforms and industries.

SUMMARY

In one aspect, the disclosed technology pertains to a voice communications system that facilitates secure and intelligent voice interactions between users through a push-to-talk protocol. The system comprises a communication module that enables users to initiate a voice request via a push-to-talk button, allowing the recipient to accept or ignore the interaction, thereby opening a live audio stream upon acceptance.

One object of the technology is to enhance user control and privacy in voice communications by allowing interactions to be initiated only upon user consent. This approach aims to improve the efficiency and security of voice-based interactions, particularly in environments where unsolicited communication may be disruptive.

In some embodiments, the communication module is configured to activate signal transmission based on the geographic location of the user or predefined event timing. This feature allows for context-aware activation, ensuring that communication occurs only when relevant to the user's current situation or schedule.

In some embodiments, the system is unilateral or permission-based turn-taking. The system enables a configuration whereby the initiator can send a first message to the recipient. The recipient may receive a notification, such as a beep, and then has to confirm that he wishes to receive and listen to the message. This mechanism where the initiator has to request permission from the recipient to initiate communication, prevents spam-like experiences and supports structured dialogue.

In some embodiments, the system can be designed to optionally function without a cloud infrastructure, via a local-only (on-device) deployment where needed, preserving data locality and enhancing offline or sensitive-use applicability.

In another aspect, the system includes an artificial intelligence filtering module that analyzes audio data in real-time to detect sentiment within conversations. This module may further classify interaction types based on detected sentiment and enforce behavioral standards by identifying and responding to inappropriate language or behavior.

Yet another object of the technology is to provide real-time feedback to users regarding detected inappropriate behavior, thereby promoting respectful and safe communication standards. The system may also automatically terminate the live audio stream upon detection of predefined behavioral violations, ensuring compliance with communication policies.

In an embodiment, the artificial intelligence filtering module is configured to generate alerts for system administrators upon detection of repeated behavioral violations, facilitating proactive management of user interactions and maintaining a secure communication environment.

In contrast to traditional real-time moderation systems that respond to inappropriate speech during or after delivery, the system of the invention provides a preventive filtering layer. Audio content is first analyzed, and then transmitted only after authorization, ensuring recipients are never exposed to harmful or inappropriate speech.

DETAILED DESCRIPTION OF THE INVENTION

In one aspect, the present invention relates to a communication system comprising several components that facilitate structured, consent-based push-to-talk (PTT) voice communication. The system includes a user interface (UI) configured to incorporate a PTT button, which serves as the primary mechanism for initiating communication. Upon activation of the PTT button by a user, a communication module transmits a signal to a second user. This signal is transmitted without establishing a communication channel, thereby allowing the recipient to decide whether to accept or ignore the interaction.

Figure 1:
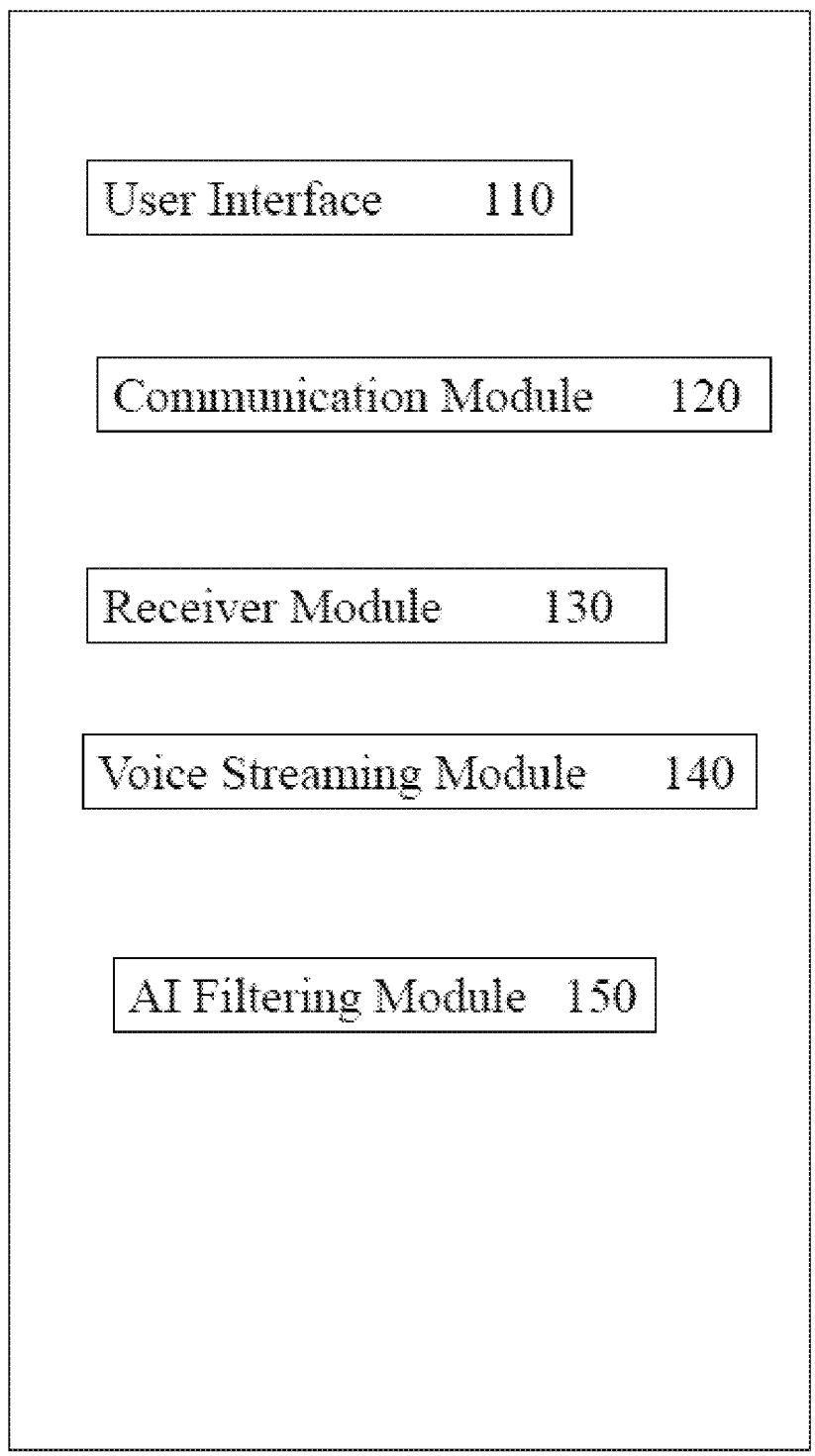
FIG. 1 is a block diagram of a voice communications system comprising a user interface, communication module, receiver module, voice streaming module, and AI filtering module.

FIG. 1 shows a schematic representation of a voice communications system 100, which comprises several key components designed to facilitate secure and intelligent voice interactions. The system includes a user interface 110, which serves as the primary point of interaction for users, allowing them to initiate and manage voice communications through a push-to-talk protocol.

The communication module 120 is responsible for managing the transmission of signals between users. This module may activate signal transmission based on various conditions, such as geographic location or predefined event timing, ensuring that communication is contextually relevant and timely.

The receiver module 130 functions to handle incoming communication requests, allowing the recipient to accept or ignore interactions. This module ensures that the communication channel is only opened upon the recipient's consent, thereby preserving user privacy and control.

The voice streaming module 140 facilitates the real-time streaming of audio data between users once the communication channel is established. This module ensures that voice data is transmitted efficiently and securely during the interaction.

The AI filtering module 150 is integrated to analyze audio data in real-time, detecting sentiment and classifying interaction types. It enforces behavioral standards by identifying inappropriate language or behavior, and it may automatically terminate the live audio stream upon detection of predefined violations. This module enhances the security and quality of the communication by providing real-time moderation and filtering capabilities.

The present invention uses a mobile communication system that enables push-to-talk (PTT) functionality between two or more mobile phones over a wireless data network. The system enables near-instantaneous voice communication between mobile endpoints, operating in a half-duplex mode whereby only one party transmits at a time, initiated by a user pressing a virtual or physical "PTT" button. In some embodiments, the system introduces a logic-based voice activation layer, allowing only predefined users to initiate communication under certain conditions.

The system may be implemented using a client-server architecture, a peer-to-peer model, or a hybrid scheme, and may utilize IP-based protocols over LTE, 5G, or Wi-Fi networks.

In one embodiment, a push-to-talk communication system comprises two or more mobile devices configured to exchange audio messages via a low-latency network channel. Each mobile device executes a PTT client application, includes a user interface with a PTT button, and is capable of capturing, encoding, transmitting, receiving, decoding, and playing audio in near real-time. The system enables voice communication only upon predefined logical conditions, which may include, but are not limited to, geographic location, time-based events, system-assigned triggers, or mutual consent between users. This ensures that the voice communication feature is contextually controlled and cannot be exploited outside the defined logic, regardless of whether physical proximity is a factor.

In another embodiment, a server-based architecture is provided, wherein a centralized PTT server manages session control, user authentication, and message routing between mobile clients.

The architecture of a PTT system comprises: mobile devices (clients), communication channels, and optionally a PTT server.

Mobile Devices (Clients)

Each mobile phone client includes:

A push-to-talk (PTT) client application is configured to execute on a mobile operating system (OS). The PTT client application may be designed to facilitate real-time voice communication over a network by utilizing the mobile device's hardware and software capabilities. The application interfaces with the mobile OS to access necessary resources such as the microphone, speaker, and network connectivity modules. For instance, the PTT client application may leverage the mobile OS's audio input/output APIs to capture and transmit voice data packets over a wireless network. Additionally, the application may utilize the OS's network stack to establish and maintain a connection with a PTT server, enabling seamless communication between users. The PTT client application may incorporate various technical features to enhance user experience and functionality. For example, the application may include a user interface that allows users to initiate and terminate voice communication sessions with a single button press, emulating traditional walkie-talkie functionality. The application may also support background operation, allowing users to receive incoming PTT calls even when the application is not actively in use. Furthermore, the PTT client application may implement data compression algorithms to optimize bandwidth usage and ensure efficient transmission of voice data over the network. The application may also be designed to work across different mobile OS platforms, such as Android and iOS, by utilizing platform-specific development frameworks and libraries. In some embodiments, the system may be provided as a Software Development Kit (SDK) that enables third-party developers to integrate the push-to-talk (PTT) communication, AI-based voice filtering, and contextual activation features into their own applications. The SDK may be modular and designed to support both mobile environments (iOS, Android) and web-based platforms (e.g., using JavaScript and WebRTC), allowing for seamless embedding within existing software ecosystems. This deployment model facilitates rapid adoption across industries by minimizing development overhead and ensuring platform compatibility. A user interface may comprise a push-to-talk control, such as a button, which can be configured to facilitate voice communication. The push-to-talk control may be integrated into a graphical user interface (GUI) displayed on a touchscreen device, allowing the user to activate the control by applying pressure to the designated area on the screen. Alternatively, the push-to-talk control may be implemented as a physical button on a handheld communication device, such as a two-way radio or a smartphone. The control may be operatively connected to a communication module, which can be configured to transmit audio signals over a network upon activation. The push-to-talk control may further include feedback mechanisms, such as visual indicators on the display or haptic feedback, to confirm activation status to the user. A microphone/audio module configured to capture and reproduce voice data, comprising a microphone element for converting acoustic signals into electrical signals, an analog-to-digital converter (ADC) for transforming the electrical signals into digital data, and a digital signal processor (DSP) for processing the digital data to enhance audio quality. The module may further include a speaker element for converting processed digital signals back into acoustic signals, and a digital-to-analog converter (DAC) for transforming digital signals into analog signals suitable for driving the speaker. The module may be integrated with noise-cancellation technology to reduce ambient noise interference and may support various audio codecs to ensure compatibility with different audio formats. A communication module configured to manage network transport protocols, such as Transmission Control Protocol (TCP) and User Datagram Protocol (UDP) over Internet Protocol (IP), may include various components to facilitate efficient data transmission. For instance, the module may incorporate a packet scheduler to prioritize data packets based on predefined criteria, such as Quality of Service (QoS) requirements. Additionally, the module may include a congestion control mechanism to dynamically adjust the data transmission rate in response to network conditions, thereby minimizing packet loss and ensuring reliable communication. Error detection and correction algorithms may also be integrated to identify and rectify data transmission errors, enhancing the overall integrity of the communication process. Furthermore, the module may support secure data transmission through encryption protocols, such as Transport Layer Security (TLS), to protect data integrity and confidentiality during network transport. Optionally, the system may include a presence module configured to indicate the availability status of a user. This module can be implemented using a combination of hardware and software components. For instance, the presence module may utilize a network interface to communicate with a central server, which maintains real-time status updates. The availability status may include various states such as "online," "busy," "away," or "do not disturb," each of which can be represented by distinct indicators, such as LED lights or graphical icons on a user interface. The presence module may further incorporate sensors to detect user activity, such as motion sensors or keyboard activity monitors, to automatically update the status based on user interaction with the system.

Communication Channel

Voice data is transmitted using packet-switched communication, which may include the following methods:

Real-Time Transport Protocol (RTP) over User Datagram Protocol (UDP): RTP is a protocol designed for delivering audio and video over IP networks, providing end-to-end network transport functions suitable for applications transmitting real-time data. UDP is a communication protocol that offers a connectionless datagram service, which is used in conjunction with RTP to facilitate the low-latency transmission of voice data. Web Real-Time Communication (WebRTC) or custom low-latency transport: WebRTC is an open-source project that enables real-time communication of audio, video, and data in web browsers and mobile applications via simple application programming interfaces (APIs). It supports peer-to-peer connections, allowing voice data to be transmitted with minimal delay. Custom low-latency transport mechanisms may also be employed to optimize the transmission of voice data, depending on specific application requirements. Encoding using codecs such as Adaptive Multi-Rate Narrowband (AMR-NB), Opus, or Speex: These codecs are employed to compress and encode voice data for efficient transmission. AMR-NB is a codec optimized for speech coding in mobile networks, providing a range of bit rates to balance quality and bandwidth usage. Opus is a versatile audio codec designed for interactive speech and music transmission over the Internet, offering high-quality audio at various bit rates. Speex is an open-source codec specifically designed for compressing voice at low bit rates, suitable for applications where bandwidth is limited.

PTT Server (Optional)

In server-based implementations, a central server may perform the following functions:

Session control, which may include the initiation and termination of Push-to-Talk (PTT) sessions. This process may involve the use of signaling protocols such as Session Initiation Protocol (SIP) to establish, modify, and terminate multimedia sessions. Authentication and user management, which may involve verifying user credentials through protocols such as RADIUS (Remote Authentication Dial-In User Service) or Diameter, and managing user profiles and permissions within a database system, potentially utilizing Lightweight Directory Access Protocol (LDAP) for directory services. Presence tracking and call routing, which may include monitoring the availability status of users and directing calls to the appropriate endpoints. This may be achieved through the use of presence protocols such as Extensible Messaging and Presence Protocol (XMPP) or SIP for Instant Messaging and Presence Leveraging Extensions (SIMPLE). Buffering or forwarding audio packets, which may involve temporarily storing audio data in a buffer to accommodate network latency and ensure smooth playback, as well as forwarding packets to the intended recipients using Real-time Transport Protocol (RTP) for audio streaming.

In peer-to-peer configurations, signaling may be initiated through a rendezvous server, which facilitates the initial connection between devices. Upon establishing this connection, the devices may engage in a handshake protocol to authenticate and verify each other's identity. Subsequently, the devices may exchange network configuration data, such as IP addresses and port numbers, to establish a direct communication channel. This direct channel may utilize protocols such as WebRTC or TCP/UDP for data transmission, allowing for efficient and low-latency data exchange between the devices. The rendezvous server may also assist in traversing network address translation (NAT) or firewall settings to ensure seamless connectivity.

Functional Flow

Registration: Each device may register with a central server or announce its presence to peer devices using a protocol such as Session Initiation Protocol (SIP) or a similar signaling protocol. This process may involve the exchange of device identifiers, authentication credentials, and network addresses to establish connectivity within the communication network. Session Setup: The initiating user selects a contact from a user interface, which may be implemented as a graphical display on the device, and actuates the Push-to-Talk (PTT) button. This action triggers the device to initiate a session setup request, which may include the transmission of a session initiation message to the selected contact's device. Request Handling: A signaling request, which may be formatted according to SIP or another suitable protocol, is transmitted to the recipient's device. This request may include session parameters such as codec selection, bandwidth allocation, and Quality of Service (QoS) requirements to ensure optimal audio transmission. Audio Capture and Transmission: Audio is captured using a microphone integrated into the device. The captured audio is then digitized and packetized in real-time using an audio codec, such as G.711 or Opus, to convert the analog audio signals into digital packets suitable for transmission over a network. The resulting audio packets are transmitted to the recipient's device via a direct peer-to-peer channel or routed through the server, depending on the network architecture. The transmission may utilize protocols such as Real-time Transport Protocol (RTP) for efficient delivery of audio data. Reception and Playback: The recipient's device receives the audio packets and temporarily stores them in a buffer to compensate for network jitter. The buffered audio packets are then decoded using the corresponding audio codec to reconstruct the original audio signal. The decoded audio is played back over the device's speaker with minimal latency, ensuring that the audio is delivered in near real-time to the recipient. Push-and-Hold Control: The system is designed to allow only one user to transmit audio at any given time. When a user presses the PTT button, the device suppresses incoming audio streams and activates the microphone for audio capture. This mechanism may be implemented using a floor control protocol to manage access to the communication channel. Session Termination: The voice session may be terminated by releasing the PTT button or through a period of inactivity, as determined by a predefined timeout interval. Upon termination, the device may send a session termination message to the recipient's device to conclude the communication session.

Optional Features

Group PTT sessions: Multiple recipients may receive audio data in multicast or broadcast mode, such as through the use of Internet Protocol (IP) multicast technology, which allows for the efficient distribution of audio packets to multiple endpoints simultaneously. For example, in a network utilizing the Real-time Transport Protocol (RTP), audio streams can be transmitted to a group of users by assigning a multicast IP address, enabling the recipients to join the multicast group and receive the audio data concurrently. Voice priority levels: Certain users may override active transmissions by utilizing a priority-based access control mechanism. For instance, a system may implement a priority queue where users are assigned different priority levels, allowing high-priority users to preempt ongoing lower-priority communications. This can be achieved through the use of a priority token or flag within the communication protocol, which grants the ability to interrupt and transmit over existing sessions. Message queuing: Voice messages may be stored if the recipient is offline by employing a message queuing system, such as a message broker or a queue server. For example, a system may utilize a message queue service like Apache Kafka or RabbitMQ to temporarily store voice messages. These messages can be held in the queue until the recipient becomes available, at which point the messages are delivered in the order they were received. Encryption: Secure transmission may be achieved via end-to-end or transport-level encryption. End-to-end encryption can be implemented using protocols such as the Secure Real-time Transport Protocol (SRTP), which encrypts the audio data from the sender to the recipient, ensuring that only the intended recipient can decrypt and access the content. Alternatively, transport-level encryption may be provided using protocols like Transport Layer Security (TLS), which secures the communication channel between the sender and the recipient's server, protecting the data from interception during transmission. Post-Task Communication Session: In some embodiments, the system may optionally maintain an open voice communication session for a limited duration following the completion of a defined task or event (e.g., drop-off, delivery, or service interaction). This post-task extension allows for continued interaction between parties even after the primary context has concluded, for example, if an additional item was not delivered or something needs to be verified or completed. The extended session can terminate automatically upon a timeout, user action, or context trigger (e.g., geofence exit), ensuring controlled and temporary continuation of the voice channel.

Deployment Scenarios

Carrier-integrated: Implemented on the IP Multimedia Subsystem (IMS) architecture, utilizing Push-to-Talk over Cellular (PoC) standards as defined by 3GPP TS 24.147. This integration allows for seamless communication over cellular networks, leveraging Quality of Service (QoS) parameters to ensure reliable voice transmission. The system may include features such as group calling, presence information, and priority handling, which are essential for efficient communication in various network conditions. OTT model: An application-based solution that operates over-the-top (OTT) of existing mobile data networks or Wi-Fi connections. This model employs Voice over IP (VoIP) protocols, such as Session Initiation Protocol (SIP) and Real-time Transport Protocol (RTP), to facilitate voice communication. The application may be designed to dynamically switch between mobile data and Wi-Fi to optimize connectivity and reduce latency, ensuring consistent performance across different network environments. Enterprise: Deployed in mission-critical systems, such as those used by security personnel, logistics operators, or first responders. These systems often incorporate features like end-to-end encryption, redundancy, and failover mechanisms to maintain communication integrity and availability. For example, in a security context, the system may integrate with existing surveillance and monitoring infrastructure, providing real-time communication and coordination capabilities. In logistics, the system may interface with fleet management software to enable efficient dispatch and tracking of resources.

Use cases for the system span across diverse industries: ride-hailing and logistics, online marketplaces, customer service call centers, dating platforms, food delivery, municipal services, and OEM automotive systems. Each sector benefits from PTT enriched with AI moderation, translation, and permission-driven interaction.

Accessibility and Disabilities Use-Case: The system can be utilized in applications supporting individuals with disabilities, such as communication aids for people with speech or motor impairments. The system's voice moderation, one-way transmission, and AI-assisted transcription capabilities can enable users to send clear, filtered messages using a push-to-talk interface tailored for accessibility, improving independence and safety.

Taxis and Public Transport Use-Case: The system can also be integrated into taxi dispatch and public transport coordination systems, allowing filtered, consent-based voice messages between passengers, drivers, and control centers. This enables secure communication without personal number exposure, thus enhancing operational efficiency, and supporting real-time AI filtering, in regulated transportation environments.

The system comprises a receiver module configured to present the second user with selectable options, including an option to accept an incoming signal. Upon acceptance, the receiver module initiates a live audio stream, facilitating real-time audio communication between the first and second users. Alternatively, the receiver module provides the option to ignore the signal, thereby maintaining user control over the interaction. For example, the receiver module may include a graphical user interface (GUI) on a display device, such as a touchscreen, which presents the options as interactive buttons. The receiver module may utilize a processor to execute software instructions that manage the signal processing and user interface operations. The system may employ communication protocols, such as Voice over Internet Protocol (VoIP), to establish and maintain the live audio stream. The described configuration allows for consent-based communication, ensuring that the interaction is non-intrusive and respects user preferences. The system enables one-directional or team-restricted communication in multiplayer games. Voice access can be limited based on in-game roles, timing, or mission status, preventing spam and enabling tactical voice control within competitive settings.

The voice streaming module is configured to transmit audio data during the engagement of the push-to-talk (PTT) button. This module may include a digital signal processor (DSP) for encoding audio signals into a digital format suitable for transmission over a network. For instance, the DSP may utilize codecs such as G.711 or G.729 to compress the audio data, thereby optimizing bandwidth usage. The module may further incorporate a buffer to manage data flow, ensuring continuous audio streaming without interruption. The voice streaming module is operatively connected to a network interface, which may include wireless communication protocols such as Wi-Fi or LTE, to facilitate the transmission of the encoded audio data to a remote receiver. The module is designed to activate the transmission process only during the active engagement of the PTT button, thereby establishing a temporary and controlled communication session. This controlled session may be terminated upon the release of the PTT button, at which point the module ceases audio data transmission, ensuring efficient use of network resources.

The system comprises an artificial intelligence (AI) filtering module configured to classify and moderate audio data in real-time. The AI module is integrated into the system architecture to facilitate the analysis of audio data streams. This integration allows for the continuous monitoring of audio inputs, enabling the system to process and evaluate data as it is received. The AI module may utilize machine learning algorithms, such as neural networks or support vector machines, to perform these tasks efficiently.

Unlike most voice messaging systems, the system performs pre-transmission analysis of voice data. This includes AI-powered natural language processing to:—Detect and block offensive language; —Classify tone/sentiment (optional); and—Decide if the message complies with the application's regulations or context-based rules. This process happens before the message is sent to the recipient, ensuring that only filtered, appropriate voice content is transmitted.

Compared to traditional reviewing system that typically try to detect keywords in a blacklist, the the system's thorough filtering review and analysis of offensive and inappropriate language, assures a high-level of message integrity.

The system performs its AI-based analysis and filtering prior not only to message storage or server transmission, but specifically before the voice message becomes accessible or audible to the recipient. This ensures that potentially inappropriate or unintended content is stopped before reaching the other party, offering an essential control layer absent in typical voice communication systems.

The AI filtering capability within the voice communications system can manifest in various ways, depending on the context and requirements of the interaction. Below are examples of how the AI filtering module can be applied in different scenarios:

Blocking Inappropriate Content: In a customer support environment, the AI filtering module can detect offensive language or profanity in real-time. Upon identification, the system can block the transmission of the inappropriate content, preventing it from reaching the recipient. For instance, if a user attempts to send a message containing explicit language, the AI module can intercept and block the message, ensuring that the communication remains respectful and professional. Terminating the Session: In a social media platform, the AI filtering module can monitor conversations for aggressive or threatening behavior. If such behavior is detected, the system can automatically terminate the live audio stream to protect users from harassment. For example, if a user exhibits repeated aggressive speech patterns, the AI module can trigger an immediate termination of the session, thereby maintaining a safe communication environment. Classifying Interaction Types: In a call center application, the AI filtering module can classify interactions based on detected sentiment and context. This classification allows the system to route calls to the appropriate department or agent. For instance, if the AI module identifies a conversation as a technical support inquiry, it can automatically direct the call to a technical support specialist, optimizing response times and improving customer satisfaction. Providing Real-Time Feedback: In an educational platform, the AI filtering module can provide real-time feedback to users regarding their communication style. For example, if a student uses unclear or ambiguous language during a voice interaction, the AI module can offer suggestions for improvement, such as rephrasing or clarifying their statements, thereby enhancing the learning experience. Alerting System Administrators: In a corporate communication system, the AI filtering module can generate alerts for system administrators upon detection of repeated behavioral violations. For instance, if a user consistently engages in inappropriate conduct, the AI module can notify administrators, enabling them to take corrective action and maintain a secure communication environment. Translating Voice Messages: In a multilingual business setting, the AI filtering module can translate voice messages in real-time, allowing users who speak different languages to communicate effectively. For example, if a user speaks in Spanish, the AI module can translate the message into English for the recipient, facilitating seamless cross-language interactions.

These examples illustrate the versatility of the AI filtering module in adapting to various communication contexts, enhancing the security, efficiency, and quality of voice interactions across different platforms and industries.

The system is configured to perform filtering and moderation of audio data entirely on the first user device. This configuration ensures that the audio content, including any derivatives or processed forms, remains localized to the initiating device. The processing involves the use of integrated artificial intelligence modules that analyze the audio data in real-time, applying sentiment detection, interaction classification, and behavioral moderation directly on the device. By conducting all filtering and moderation processes locally, the system eliminates the need to transmit audio content to any intermediary location, thereby preserving user privacy and reducing potential data exposure risks. This approach leverages the device's computational capabilities to execute advanced machine learning algorithms, ensuring efficient and secure moderation without reliance on external servers or cloud-based processing.

One major advantage of the invention is its inherent scalability. By leveraging event-triggered voice activation and short-form PTT transmissions, the system avoids continuous voice streams and significantly reduces server load, enabling a multitude of users to interact concurrently with minimal latency.

The system's scalability is achieved through the implementation of a "capsule transmission" model, which facilitates efficient voice communication without the need for extensive infrastructure support. This model leverages short-form, event-triggered voice transmissions that are encapsulated into discrete data packets, or "capsules," for streamlined processing and delivery.

Each capsule is designed to contain a complete segment of voice data, including metadata for routing and processing, allowing for independent handling and transmission. This encapsulation ensures that each voice segment is self-contained, reducing dependency on continuous data streams and enabling the system to manage multiple concurrent interactions with minimal latency.

The capsule transmission model supports scalability by minimizing the load on network resources and server infrastructure. By encapsulating voice data into compact, manageable units, the system can efficiently route and process communications across diverse network environments, including low-bandwidth or high-latency conditions. This approach allows the system to accommodate a large number of users simultaneously, without requiring significant increases in server capacity or bandwidth allocation.

Furthermore, the capsule transmission model enhances the system's adaptability to various deployment scenarios, including mobile and web-based platforms. The lightweight nature of the capsules enables seamless integration with existing communication frameworks, facilitating cross-platform compatibility and reducing the need for specialized hardware or software modifications.

Overall, the capsule transmission model provides a scalable solution for voice communication, enabling the system to efficiently handle high volumes of interactions while maintaining performance and reliability across diverse operational contexts.

The AI module is designed to detect sentiment within the audio data. Sentiment analysis involves the identification of emotional tone and intent within spoken language. For instance, the module may employ natural language processing (NLP) techniques to discern whether the speaker's tone is positive, negative, or neutral. This capability is achieved through the application of pre-trained models that have been exposed to diverse datasets, allowing the system to recognize patterns and infer sentiment accurately.

In addition to sentiment detection, the AI module is capable of classifying interaction types. This classification process involves categorizing audio interactions based on predefined criteria, such as conversational context or subject matter. For example, the module may distinguish between customer service inquiries and casual conversations by analyzing linguistic cues and contextual information. This classification enhances the system's ability to tailor responses and manage interactions effectively.

The AI module may also enforce behavioral standards by identifying and responding to inappropriate language or behavior. This functionality is achieved through the implementation of rule-based systems or machine learning models trained to recognize specific keywords or phrases indicative of undesirable conduct. Upon detection of such language or behavior, the module can trigger predefined actions, such as issuing warnings or escalating the interaction to human moderators, thereby maintaining a respectful and safe communication environment.

Furthermore, the integration of the AI module into the system enhances both security and efficiency. By automating the monitoring and moderation of audio data, the system reduces the need for manual oversight, allowing human resources to be allocated to more complex tasks. Additionally, the real-time processing capabilities of the AI module ensure that potential issues are addressed promptly, minimizing the risk of escalation and contributing to a more secure communication process. By embedding AI moderation directly into the audio pipeline, the system offers built-in voice content safety without requiring human intervention or post-reporting systems. This is critical for applications where harassment or spam is common (e.g., dating, ride-sharing, or gaming).

In some embodiments, the AI module can provide real-time language translation, wherein the first and second users speak different languages, and the system translates and dubs each message in real-time, from the language of the sender to the language of the receiver. As used herein, "real-time" refers to processing or communication that occurs with a delay that is sufficiently short to allow for effective or perceived immediate interaction or responsiveness, given the context of the application.

In one embodiment, the system may be implemented in a mobile application where users can initiate a PTT request by pressing a button on their smartphone screen. The recipient, upon receiving the signal, can choose to accept the interaction, which opens a live audio stream. The AI module continuously monitors the conversation, providing real-time feedback and moderation as necessary.

In another embodiment, the system may be integrated into a web-based platform, allowing users to engage in push-to-talk (PTT) communication via a browser interface. This implementation may utilize WebRTC (Web Real-Time Communication) technology to facilitate real-time voice data transmission over the internet. The browser interface may be designed using HTML5, CSS, and JavaScript, providing a user-friendly environment for initiating and managing PTT sessions. The system may employ a WebSocket protocol to maintain a persistent connection between the client and server, ensuring low-latency communication. This configuration provides flexibility and accessibility, enabling users to participate in voice interactions without the need for prior app installation, as the browser-based solution can be accessed on various operating systems, including Windows, macOS, and Linux, as well as on mobile devices running iOS or Android.

The system is configured to maintain user privacy by ensuring that no phone numbers or personal contact information are transmitted during interactions. For example, the system may utilize anonymized identifiers or encrypted tokens to facilitate communication between devices, thereby preventing the exposure of sensitive user data. Additionally, the system incorporates context-aware activation capabilities, which may include the use of geofencing technology or temporal triggers. Geofencing technology allows the system to activate signal transmission when a user enters or exits a predefined geographic area, utilizing GPS or other location-based services. Temporal triggers may be employed to initiate signal transmission at specific times or in response to scheduled events. These features enhance the system's applicability across various use cases and industries, such as retail, where location-based promotions can be delivered to users, or in logistics, where time-sensitive notifications are critical.

The voice communications system described herein includes a communication module configured to activate signal transmission based on the geographic location of the user. This feature leverages geolocation technology to enhance the contextual relevance and efficiency of the push-to-talk (PTT) communication process.

The communication module may utilize Global Positioning System (GPS) technology or other location-based services to determine the precise geographic coordinates of the user. This information is processed in real-time to assess whether the user is within a predefined geographic boundary or geofence. The geofence may be established based on specific operational requirements, such as proximity to a delivery location, a service area, or a designated meeting point.

For instance, in a delivery service application, the system can be configured to activate the PTT signal transmission only when the delivery personnel are within a certain radius of the customer's location. This ensures that communication is initiated only when it is contextually relevant, thereby reducing unnecessary interactions and enhancing operational efficiency.

The communication module may also incorporate a location-based rule engine that defines the conditions under which signal transmission is permitted. These conditions can be dynamically adjusted based on factors such as time of day, user preferences, or specific event triggers. For example, the system may allow signal transmission during business hours or when a user enters a specific zone, such as a retail store or event venue.

Additionally, the system may employ location-based notifications to inform users when they are entering or exiting a geofenced area. These notifications can serve as prompts for users to initiate or prepare for PTT communication, ensuring timely and relevant interactions.

The integration of geographic location-based activation within the communication module not only enhances the system's adaptability to various use cases but also contributes to a more efficient and user-friendly communication experience. By leveraging real-time location data, the system can provide targeted and context-aware communication capabilities, aligning with the operational needs of diverse industries such as logistics, retail, and field services.

The system described herein is configured to activate signal transmission based on predefined event timing, which enhances the contextual relevance and efficiency of the push-to-talk (PTT) communication process. This feature leverages temporal triggers to ensure that communication is initiated only when it is operationally pertinent.

The communication module may incorporate a timing engine that defines specific conditions under which signal transmission is permitted. These conditions can be dynamically adjusted based on factors such as user preferences, operational requirements, or specific event triggers. The timing engine may utilize a combination of hardware and software components to monitor and evaluate temporal conditions in real-time.

For instance, in a delivery service application, the system can be configured to activate the PTT signal transmission at a predefined time before the estimated time of arrival (ETA) at the delivery location. This ensures that communication is initiated only when it is contextually relevant, thereby reducing unnecessary interactions and enhancing operational efficiency. The timing engine may utilize algorithms to calculate the ETA based on real-time traffic data and route information, ensuring accurate timing for signal activation.

In another example, the system may be configured to activate signal transmission during specific business hours or operational windows. For instance, in a customer support scenario, the PTT communication may be enabled only during the hours when support agents are available, ensuring that user interactions are timely and relevant. The timing engine may interface with a scheduling system to retrieve and apply operational hours, dynamically adjusting the activation conditions as needed.

Additionally, the system may employ event-based triggers to activate signal transmission in response to specific occurrences. For example, in a logistics application, the PTT communication may be activated when a delivery vehicle reaches a certain checkpoint or milestone along its route. The timing engine may utilize geofencing technology or sensor data to detect these events, ensuring that communication is initiated at the appropriate time.

The integration of predefined event timing within the communication module not only enhances the system's adaptability to various use cases but also contributes to a more efficient and user-friendly communication experience. By leveraging real-time temporal data, the system can provide targeted and context-aware communication capabilities, aligning with the operational needs of diverse industries such as logistics, customer support, and field services.

The system comprises an artificial intelligence filtering module configured to analyze audio data in real-time to detect sentiment within the conversation. This module is integrated into the communication system to facilitate the continuous monitoring and evaluation of audio inputs. The AI module employs advanced natural language processing (NLP) techniques to assess the emotional tone and intent of spoken language, enabling the system to discern whether the speaker's sentiment is positive, negative, or neutral.

The sentiment detection process involves several technical components and methodologies. The AI module utilizes pre-trained machine learning models, such as recurrent neural networks (RNNs) or convolutional neural networks (CNNs), which have been exposed to extensive datasets containing diverse linguistic patterns and emotional expressions. These models are capable of recognizing subtle nuances in speech, allowing for accurate sentiment classification.

For instance, the AI module may implement a sentiment analysis algorithm that processes audio data by first converting it into text using automatic speech recognition (ASR) technology. The transcribed text is then analyzed using sentiment lexicons or word embeddings, such as Word2Vec or GloVe, to identify sentiment-bearing words and phrases. The module may also incorporate context-aware sentiment analysis, which considers the surrounding conversational context to enhance the accuracy of sentiment detection.

In practical applications, the AI module's sentiment detection capabilities can be utilized to improve user experience and interaction quality. For example, in a customer support scenario, the system can identify when a user is expressing frustration or dissatisfaction, prompting the system to escalate the interaction to a human agent for resolution. Similarly, in a social communication platform, the module can detect positive sentiment, such as enthusiasm or agreement, and adjust the interaction flow accordingly to maintain engagement.

The integration of real-time sentiment analysis within the communication system not only enhances the system's ability to respond to user emotions but also contributes to a more secure and respectful communication environment. By continuously monitoring sentiment, the system can proactively address potential issues, such as escalating conflicts or misunderstandings, thereby fostering a positive interaction experience for all users.

The system comprises an artificial intelligence filtering module configured to analyze audio data in real-time, enabling the classification of interaction types based on detected sentiment. This classification process involves the use of advanced natural language processing (NLP) techniques and machine learning algorithms to categorize audio interactions according to predefined criteria, such as conversational context, emotional tone, or subject matter.

For instance, the AI module may employ recurrent neural networks (RNNs) or convolutional neural networks (CNNs) trained on extensive datasets to recognize patterns in speech that correspond to specific interaction types. These models are capable of processing audio inputs to identify linguistic cues and contextual information, allowing the system to distinguish between various categories of communication, such as customer service inquiries, casual conversations, or technical support requests.

In a practical application, the AI module may utilize automatic speech recognition (ASR) technology to convert audio data into text, which is then analyzed using sentiment lexicons or word embeddings like Word2Vec or GloVe. This analysis enables the system to detect sentiment-bearing words and phrases, facilitating the classification of interactions based on the emotional tone and intent of the speaker.

For example, in a customer support scenario, the system can classify interactions as either complaint-related or inquiry-based, depending on the detected sentiment and context. This classification allows the system to route interactions to the appropriate department or agent, optimizing response times and improving user satisfaction.

Additionally, the AI module's ability to classify interaction types enhances the system's capacity to tailor responses and manage interactions effectively. By understanding the nature of the communication, the system can provide contextually relevant feedback or escalate interactions when necessary, ensuring a more efficient and personalized user experience.

The integration of real-time interaction classification within the communication system not only improves operational efficiency but also contributes to a more secure and respectful communication environment. By continuously monitoring and categorizing interactions, the system can proactively address potential issues, such as escalating conflicts or misunderstandings, thereby fostering a positive interaction experience for all users.

In some embodiments, a buffer zone component can be designed to facilitate the off-device processing of digital messages while maintaining the integrity and security of the message content prior to transmission. The buffer zone serves as an intermediary storage and processing area where digital messages are temporarily held and analyzed before being sent to the recipient. This approach allows for comprehensive moderation and filtering of content, ensuring that only approved messages are transmitted.

Implementation of the Buffer Zone:

Local Device Buffering: In one embodiment, the buffer zone is implemented as a local storage area within the sender's device. This storage area is configured to temporarily hold digital messages, such as voice or video data, captured by the device's input modules. The buffer is managed by a dedicated software component that interfaces with the device's operating system to allocate memory resources efficiently. The local buffer is equipped with encryption capabilities to secure the stored data, ensuring that it remains protected from unauthorized access during the moderation process. The encryption may utilize advanced cryptographic algorithms, such as AES (Advanced Encryption Standard), to safeguard the data. Cloud-Based Buffering: In another embodiment, the buffer zone is implemented as a cloud-based service, where digital messages are uploaded to a secure server for processing. This approach leverages cloud computing resources to perform intensive analysis tasks, such as sentiment detection and content classification, without burdening the sender's device. The cloud-based buffer is designed to handle large volumes of data, providing scalability and flexibility for applications with high user traffic. Data transmission to and from the cloud buffer is secured using end-to-end encryption protocols, such as TLS (Transport Layer Security), to maintain data confidentiality and integrity. Hybrid Buffering System: A hybrid approach combines local and cloud-based buffering, where initial processing occurs on the sender's device, and more complex analysis is offloaded to the cloud. This system optimizes resource utilization by performing lightweight tasks locally and reserving cloud resources for computationally demanding operations. The hybrid buffer system can dynamically adjust the processing location based on network conditions, device capabilities, and user preferences, ensuring optimal performance and user experience.

Advantages of the Buffer Zone:

Enhanced Security and Privacy: By processing digital messages in a buffer zone before transmission, the system ensures that sensitive content is not exposed to recipients until it has been thoroughly vetted. This pre-transmission analysis prevents the dissemination of inappropriate or harmful content, protecting both the sender and recipient. The use of encryption within the buffer zone further enhances security, ensuring that data remains confidential and tamper-proof during the moderation process. Improved Moderation Accuracy: The buffer zone allows for comprehensive analysis of digital messages using advanced AI algorithms. By holding messages temporarily, the system can perform detailed sentiment analysis, content classification, and behavioral assessment, leading to more accurate moderation outcomes. The ability to process messages off-device enables the use of sophisticated machine learning models that require significant computational power, improving the system's ability to detect nuanced content issues. Scalability and Flexibility: The buffer zone architecture supports scalable processing, accommodating varying levels of user activity and data volume. Cloud-based buffering, in particular, provides the elasticity needed to handle peak loads without compromising performance. The system's flexibility allows for customization of moderation criteria and processing workflows, enabling adaptation to different application contexts and user requirements. Reduced Latency and Resource Utilization: By performing initial processing locally, the buffer zone reduces the need for constant data transmission to external servers, minimizing network latency and bandwidth usage. This approach is particularly beneficial in environments with limited connectivity or high data costs. The hybrid buffering model optimizes resource allocation, ensuring that device and network resources are used efficiently, enhancing overall system performance.

In summary, the buffer zone is a versatile and secure component that facilitates the effective moderation of digital messages, ensuring that only compliant content is transmitted to recipients. Its implementation across local, cloud-based, and hybrid systems provides a robust framework for maintaining communication integrity and user privacy.

Figure 2:
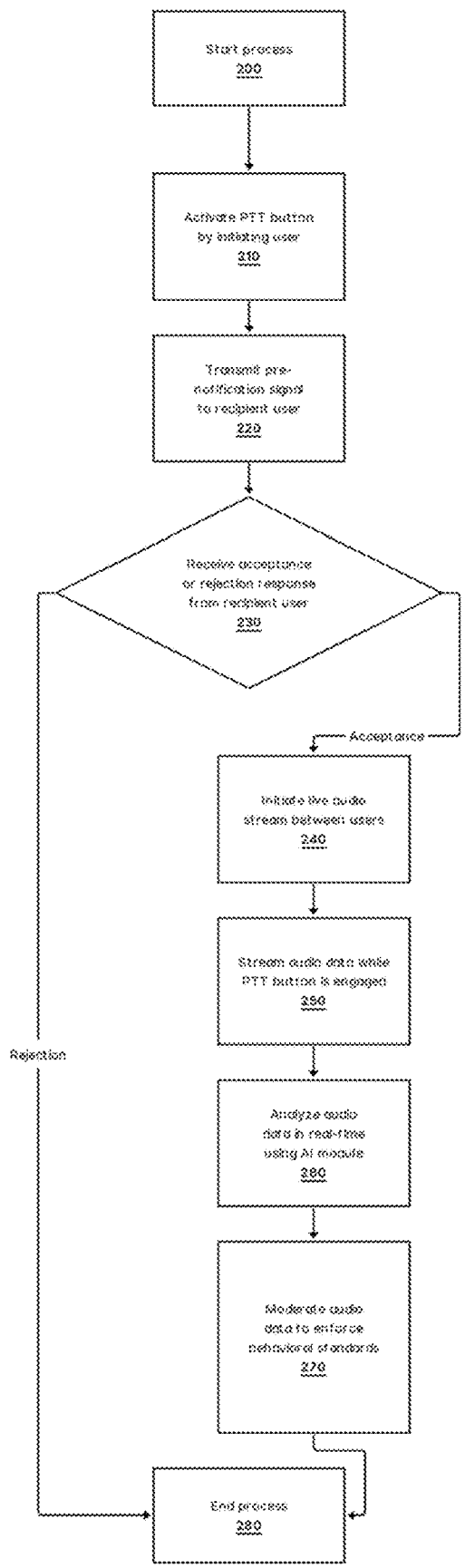
FIG. 2 is a flowchart illustrating a method for facilitating voice communication between users, comprising steps for initiating, transmitting, and moderating audio data.

FIG. 2 shows a flowchart illustrating the process of the Smart AI Push Interaction (SAPI) protocol. The process begins at step 200, where the system initiates the communication sequence. At step 210, the initiating user activates the Push-to-Talk (PTT) button, signaling the desire to communicate.

Following activation, step 220 involves transmitting a pre-notification signal to the recipient user, alerting them of the incoming communication request. At step 230, the system receives either an acceptance or rejection response from the recipient user. If the recipient accepts, the process proceeds to step 240, where a live audio stream is initiated between the users.

During step 250, audio data is streamed while the PTT button remains engaged by the initiating user. Concurrently, at step 260, the audio data is analyzed in real-time using an AI module. This analysis is crucial for maintaining the integrity of the communication.

At step 270, the system moderates the audio data to enforce behavioral standards, ensuring compliance with predefined communication protocols. The process concludes at step 280, where the communication session is terminated, marking the end of the process.

In another aspect, the present invention relates to a method for facilitating voice communication between users comprises several steps, beginning with the transmission of a pre-notification signal to a recipient user upon activation of a push-to-talk (PTT) button by an initiating user. This pre-notification signal is transmitted without establishing a communication channel, allowing the recipient user to decide whether to accept or reject the communication request.

Upon receiving an acceptance response from the recipient user, a live audio stream is initiated between the initiating user and the recipient user. The audio data is streamed from the initiating user to the recipient user while the PTT button remains engaged, contingent upon the acceptance response. This ensures that the communication is consent-based and controlled by the recipient.

The method further includes the real-time analysis of the audio data using an artificial intelligence filtering module. This module is configured to detect sentiment within the conversation and classify interaction types based on the detected sentiment. The AI module employs advanced natural language processing (NLP) techniques and machine learning algorithms, such as recurrent neural networks (RNNs) or convolutional neural networks (CNNs), to perform these tasks efficiently.

In addition to sentiment detection and interaction classification, the method involves moderating the audio data in real-time to enforce behavioral standards. This is achieved by identifying and responding to inappropriate language or behavior. The AI module may utilize rule-based systems or machine learning models trained to recognize specific keywords or phrases indicative of undesirable conduct. Upon detection of such language or behavior, the system can trigger predefined actions, such as issuing warnings or escalating the interaction to human moderators, thereby maintaining a respectful and safe communication environment.

The described method is applicable in various communication systems, including mobile applications and web-based platforms, where users can engage in push-to-talk (PTT) communication via a user-friendly interface. The system is designed to maintain user privacy by ensuring that no phone numbers or personal contact information are transmitted during interactions. This approach enhances security and efficiency in digital interactions, providing a flexible and context-aware solution for voice communication.

The described systems and methods are applicable not only to push-to-talk (PTT) interactions, but also to any voice messaging flow—including one-to-one, group messaging, or any asynchronous voice communication—wherein audio content is captured and temporarily held (buffered) prior to transmission or exposure to any recipient or endpoint, allowing for AI-based pre-send moderation, and transmission or rendering of the audio is performed only upon approval by the filtering mechanism, wherein the holding mechanism may further be used for additional processing such as manual review, audio transformation, language translation, delayed sending, or other content adaptations prior to transmission.

In another aspect, the present invention relates to a system for moderating pre-recorded or live digital messages prior to their transmission to a recipient comprising several key components, each designed to ensure the integrity and compliance of the messages with predefined behavioral standards. The system includes a recording module, a moderation module, an authorization module, and a transmission module.

Recording Module:

The recording module is configured to capture and store digital messages from a sender. This module may be implemented using a combination of hardware and software components. For instance, the module can utilize a microphone or camera to capture audio or video data, which is then digitized and stored in a local or cloud-based storage system. The storage system may employ data compression techniques to optimize space utilization and ensure efficient retrieval of the stored messages.

In one embodiment, the recording module is integrated into a mobile application, allowing users to record voice messages directly from their smartphones. The application may provide a user-friendly interface with controls for starting, pausing, and stopping the recording process. The recorded messages are then stored in a secure format, such as an encrypted file, to protect the content from unauthorized access.

Moderation Module:

The moderation module is responsible for analyzing the stored digital messages using artificial intelligence classification techniques. This module employs machine learning algorithms, such as neural networks or support vector machines, to detect inappropriate content, sentiment, and interaction types. The algorithms are trained on extensive datasets that include examples of various categories of inappropriate content, such as hate speech, harassment, and discriminatory language.

In one embodiment, the moderation module is implemented as a cloud-based service, where the recorded messages are uploaded for analysis. The service utilizes high-performance computing resources to perform complex analysis tasks, such as sentiment detection and content classification. The module may also incorporate natural language processing (NLP) techniques to evaluate the linguistic and contextual attributes of the messages, enhancing the accuracy of the moderation process.

Authorization Module:

The authorization module is configured to approve or reject the digital messages based on the analysis performed by the moderation module. This module ensures compliance with predefined behavioral standards by evaluating the results of the moderation analysis. If the message is deemed appropriate, the authorization module grants approval for transmission. Conversely, if the message contains inappropriate content, the module rejects the transmission request.

In one embodiment, the authorization module is integrated into the moderation service, allowing for seamless communication between the analysis and decision-making processes. The module may utilize rule-based systems to define the criteria for approval or rejection, ensuring consistent enforcement of communication policies.

Transmission Module:

The transmission module is responsible for transmitting the approved digital messages to the recipient. This module may be implemented using various network protocols, such as Transmission Control Protocol (TCP) or User Datagram Protocol (UDP), to ensure reliable and efficient delivery of the messages. The module may also incorporate encryption techniques to secure the data during transmission, protecting it from interception or tampering.

In one embodiment, the transmission module is part of a mobile application, enabling users to send approved messages directly from their devices. The application may provide options for selecting recipients and managing message delivery, ensuring a user-friendly experience.

EXAMPLES AND EMBODIMENTS

Mobile Application Integration: In a mobile application, the system can be implemented to allow users to record voice messages, which are then analyzed by the moderation module. The authorization module evaluates the analysis results, and approved messages are transmitted to the recipient via the application's messaging platform. This embodiment provides a seamless user experience, with real-time feedback on message compliance. Cloud-Based Moderation Service: A cloud-based service can be employed to handle the moderation and authorization processes. Users upload their recorded messages to the cloud, where the moderation module performs analysis using advanced AI techniques. The authorization module then determines message compliance, and approved messages are transmitted to recipients through a secure network connection. This embodiment offers scalability and flexibility, accommodating high volumes of user activity. Enterprise Communication System: In an enterprise setting, the system can be integrated into corporate communication platforms to ensure that all digital messages comply with organizational policies. The moderation module analyzes messages for inappropriate content, and the authorization module enforces compliance standards. Approved messages are transmitted through the enterprise network, ensuring secure and policy-compliant communication.

These embodiments illustrate the versatility and effectiveness of the system in moderating digital messages, ensuring that only compliant content is transmitted to recipients while maintaining security and user privacy.

In some embodiments, the system is configured to perform real-time analysis and moderation of voice messages using an artificial intelligence (AI) module. This process involves several technical features and methodologies to ensure that the analysis and moderation are conducted efficiently and effectively.

The AI module is integrated into the system architecture to facilitate continuous monitoring and evaluation of audio inputs. It employs advanced natural language processing (NLP) techniques and machine learning algorithms to analyze the content of voice messages as they are captured. The module utilizes automatic speech recognition (ASR) technology to convert audio data into text, enabling further analysis of linguistic and contextual attributes.

The real-time analysis process begins with the capture of voice data through the system's microphone/audio module. The captured audio is immediately digitized and processed by the AI module. The module employs pre-trained machine learning models, such as recurrent neural networks (RNNs) or convolutional neural networks (CNNs), which have been trained on extensive datasets to recognize patterns indicative of inappropriate content, sentiment, and interaction types.

For instance, the AI module may implement a sentiment analysis algorithm that evaluates the emotional tone of the transcribed text. This involves the use of sentiment lexicons or word embeddings, such as Word2Vec or GloVe, to identify sentiment-bearing words and phrases. The module can detect whether the speaker's tone is positive, negative, or neutral, allowing for the classification of interactions based on the detected sentiment.

In addition to sentiment detection, the AI module is capable of identifying specific categories of inappropriate content, such as hate speech, harassment, or discriminatory language. This is achieved through the application of rule-based systems or machine learning models trained to recognize specific keywords or phrases indicative of undesirable conduct. Upon detection of such content, the module can trigger predefined actions, such as issuing warnings or escalating the interaction to human moderators.

The moderation process is conducted in real-time, ensuring that any inappropriate content is identified and addressed promptly. The AI module continuously monitors the audio stream, providing real-time feedback to users regarding detected inappropriate behavior. This feedback may include visual or auditory alerts, allowing users to adjust their communication style accordingly.

The integration of real-time analysis and moderation within the communication system not only enhances the system's ability to respond to user emotions but also contributes to a more secure and respectful communication environment. By continuously monitoring sentiment and content, the system can proactively address potential issues, such as escalating conflicts or misunderstandings, thereby fostering a positive interaction experience for all users.

The system for moderating digital messages incorporates a moderation module configured to detect categories of inappropriate content, including but not limited to hate speech, harassment, sexual abuse, racism, self-harm, bullying, threats of violence, and discriminatory language. This detection is achieved through the utilization of machine learning algorithms trained on datasets representative of these categories.

Implementation of the Moderation Module:

Machine Learning Algorithms: The moderation module employs advanced machine learning algorithms, such as convolutional neural networks (CNNs) and recurrent neural networks (RNNs), to analyze digital messages. These algorithms are trained on extensive datasets that include examples of various categories of inappropriate content. The training process involves exposing the models to labeled data, allowing them to learn patterns and features associated with each category of content. For instance, a CNN may be used to process audio spectrograms, identifying acoustic features indicative of aggressive or threatening speech. An RNN, on the other hand, may analyze the temporal sequence of words in a text transcript to detect patterns of harassment or bullying. Natural Language Processing (NLP) Techniques: The moderation module integrates NLP techniques to enhance the analysis of linguistic and contextual attributes of digital messages. Techniques such as sentiment analysis, named entity recognition, and part-of-speech tagging are employed to extract meaningful information from text data. These techniques enable the system to understand the context and intent behind the words, improving the accuracy of content classification. For example, sentiment analysis can identify negative emotional tones in a message, while named entity recognition can detect references to specific individuals or groups, which may be relevant in cases of targeted harassment or discrimination. Contextual Analysis: The moderation module conducts contextual analysis by evaluating the linguistic, acoustic, and behavioral attributes of the speaker. This involves considering the surrounding context of the message, such as previous interactions, user history, and environmental factors. By incorporating contextual information, the system can make more informed decisions about the appropriateness of the content. In one embodiment, the system may utilize a context-aware model that adjusts its analysis based on the user's interaction history. For instance, if a user has a history of using offensive language, the system may apply stricter moderation criteria to their messages.

Examples and Embodiments

Real-Time Voice Moderation: In a live voice communication scenario, the moderation module can analyze audio data in real-time to detect inappropriate content. The system may employ a combination of acoustic feature extraction and NLP techniques to identify harmful speech patterns. Upon detection, the system can issue warnings to the user or automatically terminate the communication session to prevent the transmission of inappropriate content. Multilingual Content Analysis: The moderation module can be configured to support multilingual content analysis, allowing it to detect inappropriate content in multiple languages. This is achieved by training the machine learning models on multilingual datasets and incorporating language-specific NLP techniques. For example, the system may use language detection algorithms to identify the language of a message and apply the appropriate analysis model. Adaptive Moderation: The system can implement adaptive moderation by locally adjusting the classification of digital messages based on user behavior or feedback. This involves continuously updating the moderation criteria based on user interactions and feedback, allowing the system to adapt to changing communication norms and user preferences. For instance, if a user consistently provides feedback that certain content is misclassified, the system can adjust its analysis parameters to improve accuracy.

These embodiments illustrate the versatility and effectiveness of the moderation module in detecting and managing inappropriate content across various communication contexts, ensuring that digital messages comply with predefined behavioral standards while maintaining security and user privacy.

The moderation module conducts contextual analysis by evaluating linguistic, acoustic, and behavioral attributes of the speaker. This involves assessing the surrounding context of the message, such as prior interactions and user history, to enhance the precision in identifying harmful speech. The module utilizes machine learning models trained to recognize patterns indicative of inappropriate content, allowing for nuanced detection and classification. By incorporating contextual information, the system can make informed decisions about the appropriateness of the content, improving the accuracy of moderation outcomes.

In some embodiments, the system is configured to locally adjust the classification of digital messages based on user behavior or feedback, enabling adaptive moderation without necessitating remote model retraining. This feature is implemented through a dynamic feedback loop that continuously refines the moderation criteria in response to user interactions and feedback.

Implementation of Adaptive Moderation:

Local Feedback Integration: The system incorporates a feedback mechanism that allows users to provide input on the accuracy of content classification. This feedback is collected through the user interface, where users can indicate whether a message was correctly classified or if adjustments are needed. The feedback is processed locally on the user's device, ensuring that the system can adapt in real-time without relying on external servers. Behavioral Analysis Module: A behavioral analysis module is integrated into the system to monitor user interactions and identify patterns that may influence content classification. This module utilizes machine learning algorithms to analyze user behavior, such as message frequency, tone, and context. By understanding these patterns, the system can adjust its classification criteria to better align with the user's communication style and preferences. Contextual Adaptation: The system employs contextual adaptation techniques to refine content classification based on the specific context of the interaction. This involves analyzing the linguistic and situational context of messages to determine the most appropriate classification criteria. For example, the system may adjust its sensitivity to certain keywords or phrases based on the user's past interactions or the current conversation topic.

Examples and Embodiments

Personalized Moderation in Social Media: In a social media application, the system can adapt its moderation criteria based on user feedback and behavior. For instance, if a user frequently engages in discussions about sensitive topics, the system may adjust its classification thresholds to allow for more nuanced conversations. This personalized approach ensures that users can communicate freely while maintaining compliance with platform policies. Enterprise Communication Platforms: In an enterprise setting, the system can be configured to adapt its moderation criteria based on organizational feedback and communication norms. For example, if a company has specific guidelines for professional communication, the system can adjust its classification criteria to enforce these standards. This ensures that all digital messages align with the organization's policies while allowing for flexibility in communication styles. Educational Environments: In educational platforms, the system can adapt its moderation criteria to support diverse learning environments. For instance, if a classroom encourages open discussions on controversial topics, the system can adjust its classification criteria to accommodate these conversations while still identifying and addressing inappropriate content. This adaptive approach fosters a supportive learning environment while maintaining a respectful communication standard.

These embodiments demonstrate the system's ability to dynamically adjust content classification based on user behavior and feedback, enhancing the accuracy and relevance of moderation outcomes across various communication contexts.

In another aspect, the present invention relates to a method for moderating pre-recorded or live digital messages prior to their transmission to a recipient involves several technical components and processes to ensure compliance with predefined behavioral standards. The method begins with capturing and storing digital messages from a sender using a recording module. This module may be implemented as a software application on a mobile device or computer, equipped with a microphone or camera to capture audio or video data. The captured data is digitized and stored in a secure format, such as an encrypted file, to protect the content from unauthorized access.

The stored digital messages are then analyzed by a moderation module employing artificial intelligence classification techniques. This module utilizes machine learning algorithms, such as convolutional neural networks (CNNs) and recurrent neural networks (RNNs), to detect inappropriate content, sentiment, and interaction types. The algorithms are trained on extensive datasets that include examples of various categories of inappropriate content, such as hate speech, harassment, and discriminatory language. The moderation module may also incorporate natural language processing (NLP) techniques to evaluate the linguistic and contextual attributes of the messages, enhancing the accuracy of the analysis.

Once the analysis is complete, an authorization module evaluates the results to approve or reject the digital messages. This module ensures compliance with predefined behavioral standards by applying rule-based systems to define the criteria for approval or rejection. If the message is deemed appropriate, the authorization module grants approval for transmission. Conversely, if the message contains inappropriate content, the module rejects the transmission request.

The approved digital messages are then transmitted to the recipient via a transmission module. This module may utilize various network protocols, such as Transmission Control Protocol (TCP) or User Datagram Protocol (UDP), to ensure reliable and efficient delivery of the messages. The transmission module may also incorporate encryption techniques to secure the data during transmission, protecting it from interception or tampering.

In one embodiment, the method is applied in a mobile application where users can record voice messages. The moderation module analyzes the messages in real-time, providing immediate feedback on compliance. The authorization module evaluates the analysis results, and approved messages are transmitted to the recipient via the application's messaging platform.

In another embodiment, the method is implemented in a cloud-based service, where users upload their recorded messages for analysis. The moderation module performs the analysis using advanced AI techniques, and the authorization module determines message compliance. Approved messages are transmitted to recipients through a secure network connection, offering scalability and flexibility for applications with high user traffic.

In an enterprise communication system, the method ensures that all digital messages comply with organizational policies. The moderation module analyzes messages for inappropriate content, and the authorization module enforces compliance standards. Approved messages are transmitted through the enterprise network, ensuring secure and policy-compliant communication.

These embodiments illustrate the versatility and effectiveness of the method in moderating digital messages, ensuring that only compliant content is transmitted to recipients while maintaining security and user privacy.

Figure 3:
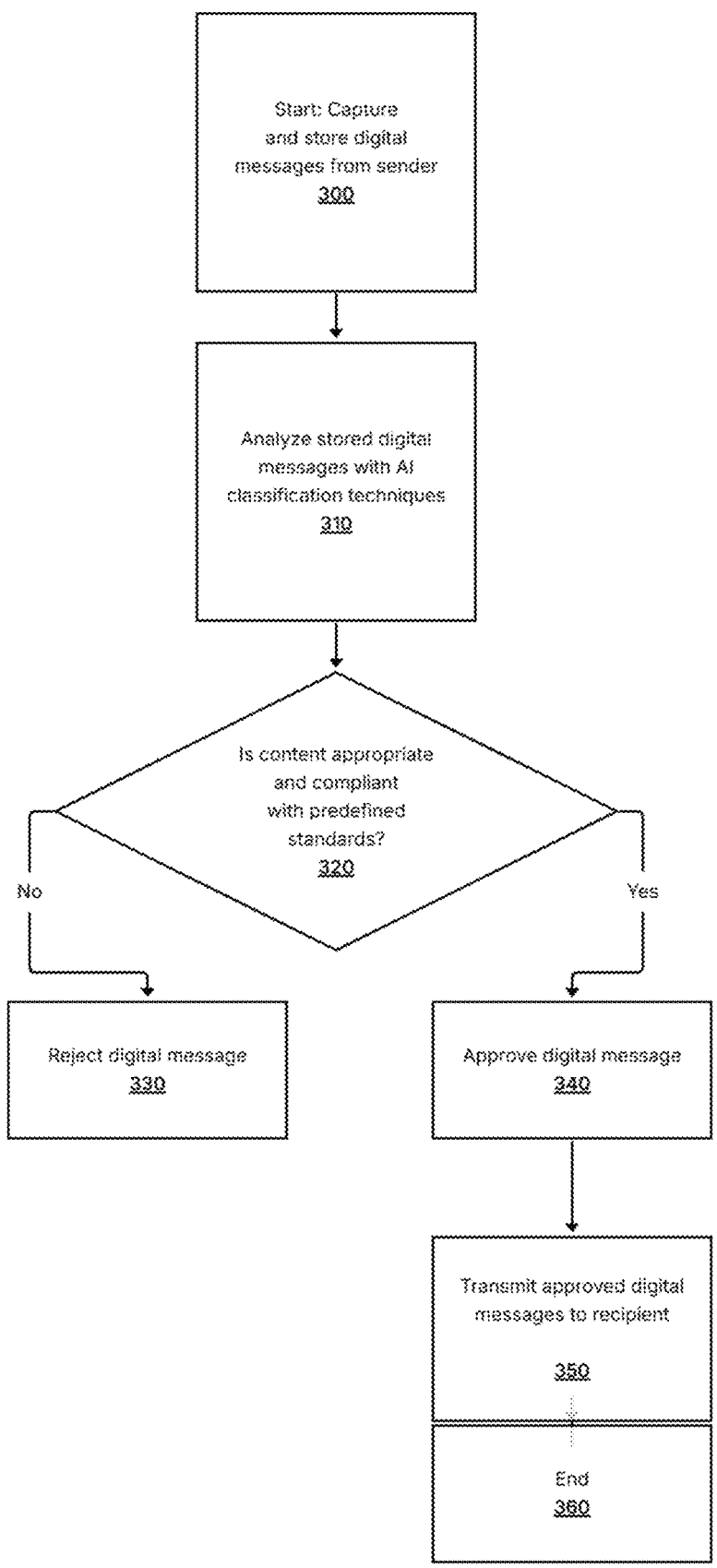
FIG. 3 is a flowchart illustrating a method for moderating digital messages, comprising steps for capturing, analyzing, approving or rejecting, and transmitting messages based on compliance with predefined standards.

FIG. 3 shows a flowchart detailing the process for moderating digital messages within the SAPI system. At step 300, digital messages from the sender are captured and stored. This initial step ensures that the messages are available for subsequent analysis and processing.

At step 310, the stored digital messages undergo analysis using AI classification techniques. This analysis is designed to evaluate the content of the messages, identifying key attributes such as sentiment and compliance with predefined standards.

Step 320 involves a decision point where the system determines whether the content is appropriate and compliant with the predefined standards. If the content is deemed inappropriate, the process moves to step 330, where the digital message is rejected. This rejection prevents the transmission of messages that do not meet the required criteria.

Conversely, if the content is found to be appropriate, the process advances to step 340, where the digital message is approved. Following approval, step 350 involves transmitting the approved digital messages to the recipient, ensuring that only compliant content is delivered.

Finally, the process concludes at step 360, marking the end of the message moderation and transmission sequence. This structured approach ensures that all digital communications within the SAPI system are moderated effectively, maintaining the integrity and security of interactions.

In some embodiments, the system is configured to facilitate the moderation of video streams by segmenting the stream into incremental portions and analyzing each portion for compliance with predefined behavioral standards. This process involves several technical components and methodologies to ensure efficient and effective moderation. The term "video stream" as referred herein, means both a live video stream and a pre-recorded video stream.

The system comprises a video capture module configured to receive live video input from a sender's device. This module utilizes the device's camera to capture video data, which is then digitized and prepared for processing. The video capture module may employ video compression techniques, such as H.264 or VP9, to optimize the data for transmission and analysis.

Once the video data is captured, the system employs a segmentation module to divide the video stream into incremental portions. The segmentation process is governed by predefined criteria, which may include temporal parameters, such as fixed time intervals (e.g., every 5 seconds), or event-based triggers, such as changes in scene or detected motion. The segmentation module utilizes algorithms to detect these criteria, ensuring that each portion is appropriately defined for subsequent analysis.

The segmented video portions are then processed by an artificial intelligence (AI) moderation module, which is configured to analyze each portion in real-time. The AI module employs machine learning algorithms, such as convolutional neural networks (CNNs), to evaluate the visual and auditory content of each segment. These algorithms are trained on extensive datasets to recognize patterns indicative of inappropriate content, such as violence, nudity, or hate symbols.

The AI moderation module also incorporates natural language processing (NLP) techniques to analyze any audio components within the video segments. This analysis involves converting audio data into text using automatic speech recognition (ASR) technology, followed by sentiment analysis to detect inappropriate language or tone.

Upon completion of the analysis, the AI moderation module determines whether each video segment complies with the predefined behavioral standards. If a segment is deemed appropriate, it is approved for transmission to the recipient. Conversely, if a segment contains inappropriate content, the module may block its transmission, issue warnings to the sender, or escalate the issue to human moderators for further review.

The system's ability to segment and analyze video streams in real-time ensures that only compliant content is transmitted to recipients, maintaining a secure and respectful communication environment. This approach allows for dynamic moderation of live interactions, providing immediate feedback and intervention when necessary. The segmentation and moderation processes are designed to operate efficiently, minimizing latency and ensuring a seamless user experience.

In the context of the metaverse environment, the method for moderating digital messages prior to their transmission to a recipient involves several technical features and processes to ensure compliance with predefined behavioral standards specific to the metaverse. The method begins with capturing and storing digital messages from a sender using a recording module. This module may be implemented as a software application within the metaverse platform, equipped with virtual input devices to capture audio or video data from avatars. The captured data is digitized and stored in a secure format, such as an encrypted file, to protect the content from unauthorized access.

The stored digital messages are then analyzed by a moderation module employing artificial intelligence classification techniques. This module utilizes machine learning algorithms, such as convolutional neural networks (CNNs) and recurrent neural networks (RNNs), to detect inappropriate content, sentiment, and interaction types. The algorithms are trained on extensive datasets that include examples of various categories of inappropriate content, such as hate speech, harassment, and discriminatory language, tailored to the metaverse context. The moderation module may also incorporate natural language processing (NLP) techniques to evaluate the linguistic and contextual attributes of the messages, enhancing the accuracy of the analysis.

Once the analysis is complete, an authorization module evaluates the results to approve or reject the digital messages. This module ensures compliance with predefined behavioral standards by applying rule-based systems to define the criteria for approval or rejection. If the message is deemed appropriate, the authorization module grants approval for transmission. Conversely, if the message contains inappropriate content, the module rejects the transmission request.

The approved digital messages are then transmitted to the recipient via a transmission module. This module may utilize various network protocols, such as Transmission Control Protocol (TCP) or User Datagram Protocol (UDP), to ensure reliable and efficient delivery of the messages within the metaverse environment. The transmission module may also incorporate encryption techniques to secure the data during transmission, protecting it from interception or tampering.

In the metaverse environment, the method further includes enforcing social and communication policies in real time during avatar communication within a shared virtual space. The moderation module analyzes digital messages to ensure compliance with predefined behavioral standards specific to the metaverse environment, such as virtual conduct guidelines and community norms. The system dynamically adjusts the communication flow based on detected policy violations, providing real-time feedback to users and maintaining a respectful and secure virtual interaction space.

The integration of these technical features within the metaverse environment not only enhances the system's ability to respond to user emotions and conduct but also contributes to a more secure and respectful communication environment. By continuously monitoring sentiment and content, the system can proactively address potential issues, such as escalating conflicts or misunderstandings, thereby fostering a positive interaction experience for all users within the metaverse.

The invention claimed is:

1. A voice communications system comprising:
   a user interface configured to include a push-to-talk (PTT) button;
   a communication module configured to transmit a signal from a first user device to a second user device upon activation of the PTT button, wherein the signal is transmitted without establishing a communication channel;
   a receiver module configured to either accept the communication automatically or allow the second user to either confirm accepting the signal, thereby initiating a live audio stream, or ignoring the signal;
   a voice streaming module configured to transmit audio data while the PTT button is engaged; and
   an artificial intelligence filtering module configured to classify and moderate the audio data in real-time, wherein the audio data is sent to the recipient only after approval of the artificial intelligence filtering module by an authorization module that ensures compliance with predefined behavior standards,
   wherein the filtering and moderation of the audio data are performed entirely on the first user device, without transmitting the audio content or any of its derivatives to an intermediary location.

2. The voice communications system of claim 1, wherein the communication module is configured to activate the signal transmission based on the user's geographic location.

3. The voice communications system of claim 1, wherein the communication module is configured to activate the signal transmission based on a predefined event timing.

4. The voice communications system of claim 1, wherein the artificial intelligence filtering module is configured to analyze the audio data in real-time to detect sentiment within the conversation.

5. The voice communications system of claim 4, wherein the artificial intelligence filtering module is further configured to classify interaction types based on the detected sentiment.

6. The voice communications system of claim 4, wherein the artificial intelligence filtering module is configured to enforce behavioral standards by identifying and responding to inappropriate language or behavior.

7. The voice communications system of claim 4, wherein the artificial intelligence filtering module is configured to filter messages or portions of messages based on detected inappropriate content.

8. The voice communications system of claim 4, wherein the artificial intelligence filtering module is configured to automatically terminate the live audio stream upon detection of predefined behavioral violations.

9. The voice communications system of claim 1, wherein the artificial intelligence filtering module is configured to translate voice messages in real time based on the preferences of the recipient.

10. The voice communications system of claim 1, wherein the analysis of the digital messages is performed on a buffer zone external to the sender's device, allowing for off-device processing while maintaining the integrity and security of the message content prior to transmission.

11. A method for facilitating voice communication between users, comprising:

transmitting a pre-notification signal to a recipient user upon activation of a push-to-talk (PTT) button by an initiating user, wherein the pre-notification signal is transmitted without establishing a communication channel;

receiving an acceptance or rejection response from the recipient user, wherein an acceptance response initiates a live audio stream between the initiating user and the recipient user;

streaming audio data from the initiating user to the recipient user while the PTT button is engaged, contingent upon the acceptance response;

analyzing the audio data in real-time using an artificial intelligence filtering module to detect sentiment and classify interaction types;

moderating the audio data in real-time to enforce behavioral standards by identifying and responding to inappropriate language or behavior, wherein the audio data is sent to the recipient only after approval of the artificial intelligence filtering module.

* * * * *